United States Patent [19]
Nishiki et al.

[11] Patent Number: 4,975,171
[45] Date of Patent: Dec. 4, 1990

[54] BIPOLAR ELECTROLYTIC CELL

[75] Inventors: Yoshinori Nishiki; Isao Sawamoto; Shunji Nakamatsu, all of Kanagawa; Takayuki Shimamune, Tokyo, all of Japan

[73] Assignee: Permelec Electrode Ltd., Kanagawa, Japan

[21] Appl. No.: 349,672

[22] Filed: May 10, 1989

[30] Foreign Application Priority Data

May 11, 1988 [JP] Japan .................... 63-114390

[51] Int. Cl.⁵ .................... C25B 9/04; C25B 1/06
[52] U.S. Cl. .................... 204/254; 204/255; 204/256; 204/129
[58] Field of Search .................... 204/253–258, 204/291, 296, 228, 129

[56] References Cited

U.S. PATENT DOCUMENTS

| 4,197,169 | 4/1980 | Zahn et al. | 204/253 X |
| 4,377,445 | 3/1983 | Grimes | 204/228 X |
| 4,413,041 | 11/1983 | Grace | 429/33 |
| 4,786,384 | 11/1988 | Gerhardt et al. | 204/253 X |

FOREIGN PATENT DOCUMENTS 0068522 5/1981 European Pat. Off. .

OTHER PUBLICATIONS

Patent Abstracts of Japan, vol. 7, No. 201, (C-184)[1346], Sep. 6, 1983; & JP-A-No. 58100686, (Musashino Kenkyusho K.K.), 15-06-1983.

Primary Examiner—Donald R. Valentine
Attorney, Agent, or Firm—Sughrue, Mion, Zinn, Macpeak & Seas

[57] ABSTRACT

A bipolar-electrode type electrolytic cell for production of ozone is disclosed, including a plurality of solid electrolyte electrodes comprising a solid electrolyte ion exchange membrane having provided on opposing sides thereof an anode and a cathode, said electrodes positioned to form a plurality of electrode compartments between adjacent solid electrolyte electrodes, such that the anodes face each other to form anode compartments and the cathodes face each other to form cathode compartments, and between the side walls of the electrolytic cell and the solid electrolyte electrodes positioned closest to the cell side walls, wherein each of the anodes and the cathodes provided on the solid electrolyte electrodes are electrically connected to a different-polar electrode, respectively, which face the same direction and are present on adjacent solid electrolyte electrodes.

7 Claims, 1 Drawing Sheet

U.S. Patent  Dec. 4, 1990  4,975,171
FIGURE
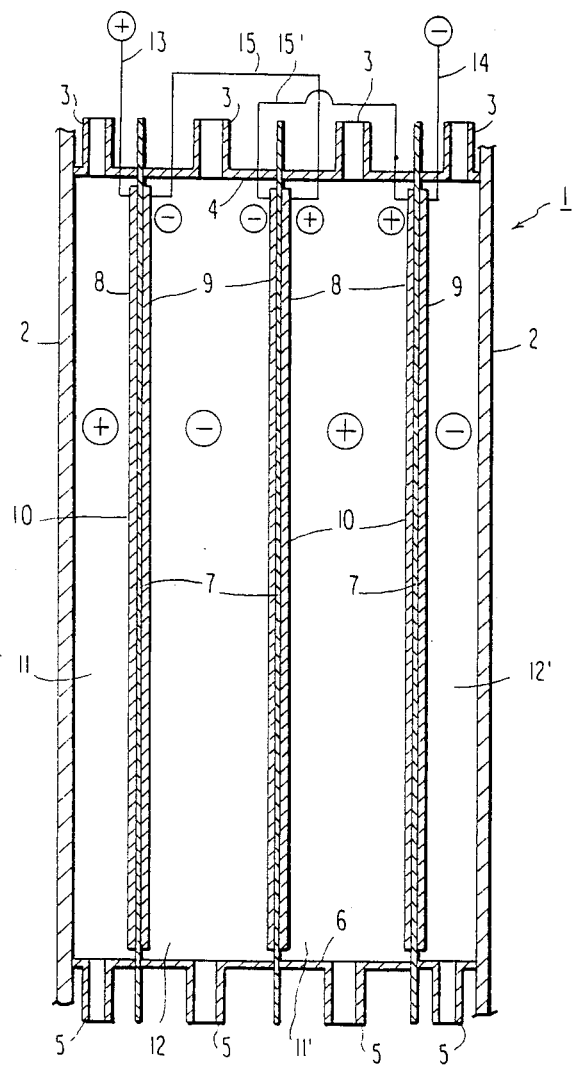

BIPOLAR ELECTROLYTIC CELL

FIELD OF THE INVENTION

The present invention relates to a solid polymer electrolyte (SPE) bipolar-electrode type electrolytic cell for use in electrolysis of an electrolytic solution having a high electric resistance, such as the production of ozone by the electrolysis of water.

BACKGROUND OF THE INVENTION

Ozone is widely used in the disposal of waste water or for purifying air, and is particularly used for the decomposition of organic compounds because of its high oxidizing power. Ozone has heretofore been commercially produced for many years by the discharging method. The discharging method produces ozone by an electric discharge, such as silent discharging in air or oxygen. In this method, however, dry oxygen is needed for production of high concentration ozone or high concentration ozone water, and consumption of the electrode leads to contamination of ozone with the electrode substance, although the electric power consumption is relatively low. Where ozone is used in the production of super pure water for electronics applications or the removal of photoresist materials, contamination of the ozone is highly undesirable. In order to overcome the above problems associated with the discharging method, an electrolyzing method whereby contamination with impurities is reduced although the electric power consumption is increased to several times that of the discharging method has been receiving attention in recent years. Moreover, wet, high concentration ozone is readily obtained by the electrolyzing method.

In the production of ozone by the electrolyzing method, an electrode having a high oxidizing ability, e.g., lead oxide is employed to electrolyze water, as described in U.S. Pat. No. 4,416,747. A plurality of small-sized electrolytic cells are usually placed together and electrolysis is carried out concurrently. This electrolyzing method can comprise a bipolar-electrode type or a monopolar-electrode type, depending on the method employed for supplying current to the electrodes.

The bipolar-electrode method employs a plurality of electrolyzing cells electrically connected in series, i.e., anode - cathode - anode - cathode - anode - cathode. Although the voltage applied thereto is large, the current usage is small. Electrical connection to the electrodes is thereby facilitated and current is uniformly distributed to the electrolytic cells. In the bipolar-electrode electrolytic cell, however, if the electrolytic compartments of each electrolytic cell are connected by conduits, a stray leakage current arises which bypasses the electrolytic solution. Even though the electrolytic solution is substantially insulating, the stray current causes a reduction of efficiency and corrosion of valves, piping and other facility components.

In order to eliminate the above problems, in the conventional bipolar-electrode type electrolytic cells, electrolyte liquids in adjacent electrode (anode and cathode) compartments are strictly separated to prevent leakage current. This separation system, however, takes away from the desirable features of the bipolar-electrode system (i.e., simple and inexpensive apparatus). Even when the electric resistance of the electrolytic solution is large, the electrolyte separation is still carried out taking the leakage current overly into account, and the apparatus is complicated.

The present inventors have proposed ozone electrolysis by the SPE method (Japanese Patent Application Nos. 297673/1987, 297674/1987 and 297675/1987). Even in the bipolar-electrode type electrolytic cell using the SPE method, the same problems as noted above occur.

SUMMARY OF THE INVENTION

The present invention overcomes the above-noted problems. The object of the present invention is to provide a bipolar-electrode type electrolytic cell having a simplified structure based on the SPE method, and for use as an electrolytic cell for the electrolysis of an electrolytic solution having a high electric resistance.

The present invention relaters to a bipolar-electrode type electrolytic cell for production of ozone, which include a plurality of solid electrolyte electrodes comprising a solid electrolyte ion exchange membrane having provided on opposing sides thereof an anode and a cathode, said electrodes positioned to form a plurality of electrode compartments comprising at least one midcompartment defined between adjacent solid electrolyte electrodes such that the anodes face each other to form anode compartments and the cathodes face each other to form cathode compartments, and two edge compartments defined between the side walls of the electrolytic cell and the solid electrolyte electrodes positioned closest to the cell side walls, wherein each of the anodes and the cathodes provided on the solid electrolyte electrodes is electrically connected to a different-polar electrode, respectively, which face the same direction and are present on adjacent solid electrolyte electrodes.

BRIEF DESCRIPTION OF THE DRAWING

The FIGURE is a longitudinal sectional view of a preferred embodiment of the bipolar-electrode type electrolytic cell of the present invention.

DETAILED DESCRIPTION OF THE INVENTION

In a conventional SPE type bipolar-electrode type electrolytic cell, only one electrode is present in each compartment. That is, solid electrolyte electrodes comprising an ion exchange member covered with an anode and a cathode on opposing sides thereof, are separated with partitions or walls and arranged in the following order: ion exchange membrane - anode - wall - cathode - ion exchange membrane - anode. In each compartment defined between the walls and the ion exchange membrane, only one of either the anode or the cathode is present. For example, in construction of a conventional type 5-element SPE bipolar-electrode electrolytic cell, five cathode compartments and five anode compartments, or a total of 10 compartments are needed. Furthermore, the large number of the compartments complicates the piping and the feature of simple construction desirable in a bipolar-electrode type electrolytic cell is lost.

In the present invention, on the other hand, the walls separating the solid electrolyte electrodes in a conventional bipolar-electrode electrolytic cell are removed, and two same-polar electrodes are placed in a single compartment. Thus, the number of compartments is reduced by about one-half. Consequently facility components such as piping are simplified, the total electrolytic cell including the facility components is decreased in size, and the desirable features of the bipolar-electrode type electrolytic cell are preserved. In the SPE bipolar-electrode type electrolytic cell of the present invention, the cell elements are arranged as follows: side wall - anode compartment - anode - ion exchange membrane - cathode - cathode compartment - cathode - ion exchange membrane - anode - anode compartment - anode - ion exchange membrane - cathode - cathode compartment - cathode - side wall, for example.

However, in a bipolar-electrode electrolytic cell wherein the aforesaid partition or wall is absent, a voltage difference corresponding to a cell voltage of one compartment is developed between the same-polar electrodes of the adjacent solid electrolytic electrodes facing each other within the same compartment. Accordingly, the electrodes having a higher potential of the two electrodes facing each other within the same compartment functions as an anode and the other, as a cathode. Thus there is a danger of a undesired electrolytic reacting occurring between the two electrodes within the same compartment. In order to prevent the undesired electrolytic reaction, it is necessary to increase the electric resistance between the two electrodes. Accordingly, the electrolytic cell of the present invention is limited to an electrolytic cell for use in the electrolysis of liquids having an electric resistance generally as high as 10 $\Omega$.cm or more and preferably 1 k$\Omega$.cm or more, e.g., the production of ozone by the electrolysis of water.

In order to greatly increase the electric resistance between the above two electrodes facing each other in the same compartment, as compared to the electric resistance of the objective electrode reactions occurring between the different-polar electrodes positioned on opposing sides of an ion exchange membrane, preferably to about 10 times the latter electric resistance, the compartment width (distance between the adjacent ion exchange membranes) is preferably increased. For example, if the distance between the different-polar electrodes is 1 mm, the distance between the above two electrodes within the same compartment of the electrolytic cell of the present invention is increased to about 10 mm.

Even if the distance between the two electrodes within the same compartment is increased to increase the electric resistance therebetween, the objective product becomes contaminated with gases formed by the undesired electrolytic reaction. For example, when ozone is produced by electrolysis of water by the use of the electrolytic cell of the present invention, the anode having a lower voltage as compared to the other anode within the same compartment acts as a cathode such that a very small amount of hydrogen gas is formed thereon to contaminate the product gas comprising oxygen and ozone.

In the present invention, however, the proportion of undesired gas can be suppressed below about 2.5 vol % by adjusting the width of the compartment and by other means. In the case of water electrolysis, the explosion limit of hydrogen in oxygen is 4 vol % and thus there is no danger of explosion. Moreover, no substantial problem arises if the amount of contaminants other than hydrogen is not more than 5 vol %.

If electrolysis is carried out with an electrolytic cell containing a plurality of compartments, the liquid temperature readily rises as a result of heat generation due to overvoltage and ohmic loss. Removal of heat is facilitated by circulating the electrolytic solution in the compartment, or by inserting a water jacket therebetween. For miniaturization of the apparatus, it is most preferred to forcibly circulate the electrolytic solution.

The bipolar-electrode electrolytic cell of the present invention comprise two compartments defined between the side wall of the electrolytic cell and the ion exchange membrane nearest to the side wall (here-after referred to as "edge compartments"), and at least one mid-compartment defined between the ion exchange membranes. The ion exchange membranes for use in the present invention is not critical as long as it is a solid electrolyte. With respect to resistance against ozone corrosion, a perfluorosulfonic acid-based ion exchange membrane is preferred. As the anode substance, lead dioxide or a substance containing lead dioxide as a main component is preferably used, and $\beta$-lead dioxide is most desirable with respect to corrosion resistance and catalytic activity. In order to completely prevent contamination with impurities, high purity gold or platinum, or other substances may be used, although catalytic activity is somewhat lower. Although the cathode substance is not critical, a substance having a small hydrogen overvoltage, e.g., platinum, is preferred in order to minimize heat generation.

Each of the anodes and cathodes provided on the solid electrolyte electrodes, other than those in the edge compartments, is electrically connected to a different-polar electrode, respecitvely, which are present on the adjacent solid electrolyte electrodes and face the same direction, in other words, being separated by the ion exchange membrane.

The anode and cathode on the edge compartments are connected to an anode and cathode collector respectively. The anode and cathode collectors are further connected to a power source during electrolysis.

The above configuration produces a voltage difference corresponding to a cell voltage of one compartment between the two same-polar electrodes present in the same compartment. However, by controlling the distance between the electrodes and the electric resistance of an electrolytic solution, the undesired electrolysis due to the voltage difference between the two electrodes within the same compartment can be prevented.

The present invention is described in greater detail with reference to one preferred embodiment illustrated in the attached drawing, although the present invention is not limited thereto.

The Figure is a longitudinal sectional view of a preferred embodiment of the bipolar-electrode type electrolytic cell of the present invention.

Between top ends of side wall 2 on both sides of electrolytic cell 1, a top plate 4 having four electrolytic solution-withdrawing outlets 3 is provided. Between bottom ends, similarly, a bottom plate 6 having four electrolytic solution-supplying inlets 5 is provided.

The interior of electrolytic cell 1 is defined into four compartments, anode compartment 11 - cathode compartment 12 - anode compartment 11' - cathode compartment 12'. Three solid electrolytic electrodes 10 positioned at the left, center and right portions of the cell and each comprising an ion exchange membrane 7 with anode 8 covered on one surface thereof and with cathode 9 on the opposite surface are held in place by top plate 4 and bottom plate 6 at the upper and lower ends of the electrodes where an electrode covering is absent. The electrodes 10 are positioned in such a manner that anodes 8 of adjacent solid electrolyte electrodes 10 face each other and cathodes 9 face each other, both with sufficient clearance.

Anode collector 13 is electrically connected to the anode at the left surface of solid electrolyte electrode 10 present in anode compartment 11 nearest to the cell wall 2. Cathode collector 14 is connected to cathode 9 on the right surface of solid electrolyte 10 present in cathode compartment 12' nearest to the cell wall 2. The upper part of cathode 9 on the right surface of solid electrolyte electrode 10 positioned at the left side is electrically connected to anode 8 on the right surface of center solid electrolyte electrode 10 with connecting wire 15. The upper part of cathode 9 on the left surface of center solid electrolyte electrode 10 is electrically connected to the upper part of anode 8 on the left surface of solid electrolyte electrode 10 positioned at the right side with connecting wire 15'.

Electricity passed from anode collector 13 in an electrolytic cell of the present invention, having the above structure, flows in the order of anode 8 on the left surface of solid electrolyte electrode 10 positioned at the left side→ion exchange membrane at the left side→cathode 9 on the right surface of solid electrolyte electrode 10 positioned at the left side→connecting wire 15→anode 8 on the right surface of center solid electrolyte electrode 10→center ion exchange membrane 7→cathode 9 on the left surface of center solid electrolyte electrode 10→connecting wire 15'→anode 8 on the left surface of solid electrolyte electrode 10 positioned at the right side→ion exchange membrane 7 positioned at the right side→cathode 9 on the right surface of solid electrolyte electrode 10 positioned at the right side, and is withdrawn from cathode collector 14. If municipal water is supplied to the cell as an electrolytic solution at electrolytic solution-supply inlets 5, oxygen gas containing ozone is generated in anode compartment 11, 11' by the anode reaction and is withdrawn from electrolytic solution-withdrawing outlets 3 located in the anode compartments. On the other hand, at cathode compartments 12, 12', hydrogen gas is generated by the cathode reaction and is withdrawn from electrolytic solution-withdrawing outlets 3 located in the cathode compartments.

Since electricity flows following the above path, an electric potential difference is produced between anodes 8 facing each other in central compartment 11' and between cathodes 9 facing each other in cathode compartment 12. In anode compartment 11' and cathode compartment 12, electrodes 8, 9 at the left side of each compartment have a higher potential than electrodes 8, 9 at the right side of each compartment. Accordingly, if the electric resistance of the electrolytic solution present between anodes 8 facing each other in compartment 11' and between cathodes 9 facing each other in compartment 12 is small, or the distance between facing anodes 8 or facing cathodes 9 is small, electrodes 8, 9 at the left side of each compartment function as anodes, and electrodes 8, 9 on the right side of each compartment function as cathodes. Between electrodes 8, and electrodes 9 facing each other in anode compartment 11' and cathode compartment 12, respectively, oxygen gas (and ozone) and hydrogen gas is generated by the electrolysis of water, and in anode compartment 11' at the central portion of the cell, oxygen gas containing ozone contaminated with hydrogen gas is produced. However, in a preferred embodiment of the present invention, the electric resistance of the electrolytic solution is sufficiently high and the distance between anodes 8 is sufficiently large to overcome the above-noted contamination problem. Thus the electric resistance between anodes 8 within the same compartment and facing each other is much larger than the resistance between different-polar electrodes 8, 9 provided on opposing sides of ion exchange membrane 7, such that the undesired electrolytic reaction is negligible.

As described above, the electrolytic cell of the present invention is an SPE bipolar-electrode type electrolytic cell in which solid electrolyte electrodes with different-polar electrodes provided on both surfaces thereof are positioned with sufficient distance therebetween to avoid undesired reactions and in such a manner that same-polar electrodes of the solid electrolyte electrodes adjacent to each other face each other. Thus, as compared with the conventional electrolytic cell, the number of compartments is reduced by about one-half.

In the usual electrolytic reaction, if two or more electrodes having an electric potential difference therebetween are placed in a single compartment, one of the electrodes acts as an anode and the other as a cathode. Thus, the anode and cathode products are disadvantageously formed in a single compartment. In the present invention, as described above, an electrolytic solution having a high electric resistance is used and the distance between same-polar electrodes within the same compartment and having a difference in electric potential is increased. The electric resistance between the two electrodes present within the same compartment is made much larger than that between different-polar electrodes adjacent to each other and provided on opposing sides of the ion exchange membrane which serves as a solid electrolyte. As a result, the objective electrode reaction between the different-polar electrodes proceeds selectively.

Accordingly, high purity anode and cathode products are obtained. Moreover, the amount of contaminating side product can be further decreased by controlling the electric resistance of an electrolytic solution and the distance between electrodes without adversely affecting the desired product.

In the bipolar-electrode electrolytic cell of the present invention, the number of compartment is decreased to nearly one-half that of a conventional electrolytic cell. Moreover, the desirable features of a bipolar-electrode electrolytic cell including small size and reduced facility components is fully realized.

In some cases, an increase in the liquid temperature due to ohmic loss, etc. occurs during the production of ozone. In the present invention, by circulating the electrolytic solution and/or providing a cooling jacket, the increase in liquid temperature is prevented.

The present invention is explained in more detail with reference to the following Examples, but the present invention is not limited thereto.

EXAMPLE 1

A SPE bipolar-electrode type electrolytic cell having the configuration as shown in the Figure was formed, wherein the solid electrolyte electrodes were prepared using a perfluorosulfonic acid-based cation exchange membrane (trade name, "Nafion 110"; produced by du Pont) as a solid electrolyte, and $\beta$-lead dioxide and platinum powder as an anode substance and a cathode substance, respectively, which were coated on the opposing sides of the solid electrolyte, the anode collector was made of titanium coated with $\beta$-lead dioxide, and the cathode collector was made of nickel electrically plated with platinum. The width of the electrode compartments was 15 mm.

With supplying a pure water in the anode compartments, electrolysis was carried out at a current density of 100 A/dm$^2$ and a voltage per one compartment of 3.2 V (9.6 V in total) while keeping the liquid temperature to 38° C. As a result, oxygen gas containing 15 wt % of ozone was obtained from the anode compartments. It was found that the proportion of hydrogen gas in the product gas was not more than 0.1 vol/%.

EXAMPLE 2

The same procedure as in Example 1 was repeated except that the pure water in the anode compartments was circulated at such a rate that the liquid volume of the electrolytic cell was circulated five times per minute, whereby the liquid temperature did not increase to more than 30° C. and the ozone concentration in the produced oxygen gas was increased to 16 wt %.

While the invention has been described in detail and with reference to specific embodiments thereof, it will be apparent to one skilled in the art that various changes and modifications can be made therein without departing from the spirit and scope thereof.

What is claimed is:

1. A bipolar-electrode type electrolytic cell including a plurality of solid electrolyte electrodes comprising a solid electrolyte ion exchange membrane having provided on opposing sides thereof an anode and a cathode, said electrodes positioned to form a plurality of electrode compartments comprising at least one mid-compartment defined between adjacent solid electrolyte electrodes such that the anodes face each other to form anode compartments and the cathodes face each other to form cathode compartments and two edge compartments defined between the side walls of the electrolytic cell and the solid electrolyte electrodes positioned closest to the cell side walls, wherein each of the anodes and the cathodes provided on the solid electrolyte electrodes are electrically connected to a different-polar electrode, respectively, which face the same direction and are present on adjacent solid electrolyte electrodes.

2. An electrolytic cell as in claim 1, wherein the ion exchange membrane is a perfluorosulfonic acid-based membrane, and an anode substance of the anode is lead dioxide or a substance containing lead dioxide as a main component.

3. An electrolytic cell as in claim 1, further comprising an electrolytic solution contained in the electrode compartments, said electrolytic solution being circulated.

4. An electrolytic cell as in claim 1, further comprising a water jacket provided in the electrode compartments.

5. An electrolytic cell as in claim 1, wherein the distance between said solid electrolyte electrodes is sufficiently large such that the extent of an electrolytic reaction occurring between same-polar electrodes within the same compartment is negligible as compared to an electrolytic reaction occurring between different-polar electrodes provided on opposing sides of the solid electrolyte ion exchange membrane.

6. An electrolytic cell as in claim 5, further comprising water as, an electrolytic liquid wherein a product of oxygen gas containing ozone gas is mainly formed in the anode compartments and hydrogen gas is mainly formed in the cathode compartments.

7. An electrolytic cell as in claim 6, wherein a product gas containing not more than 2.5 vol % hydrogen is formed in the anode compartments.

* * * * *